G. D. VAN ZANDT.
RAKE CLEANER.
APPLICATION FILED JUNE 2, 1913.
1,084,982.
Patented Jan. 20, 1914.
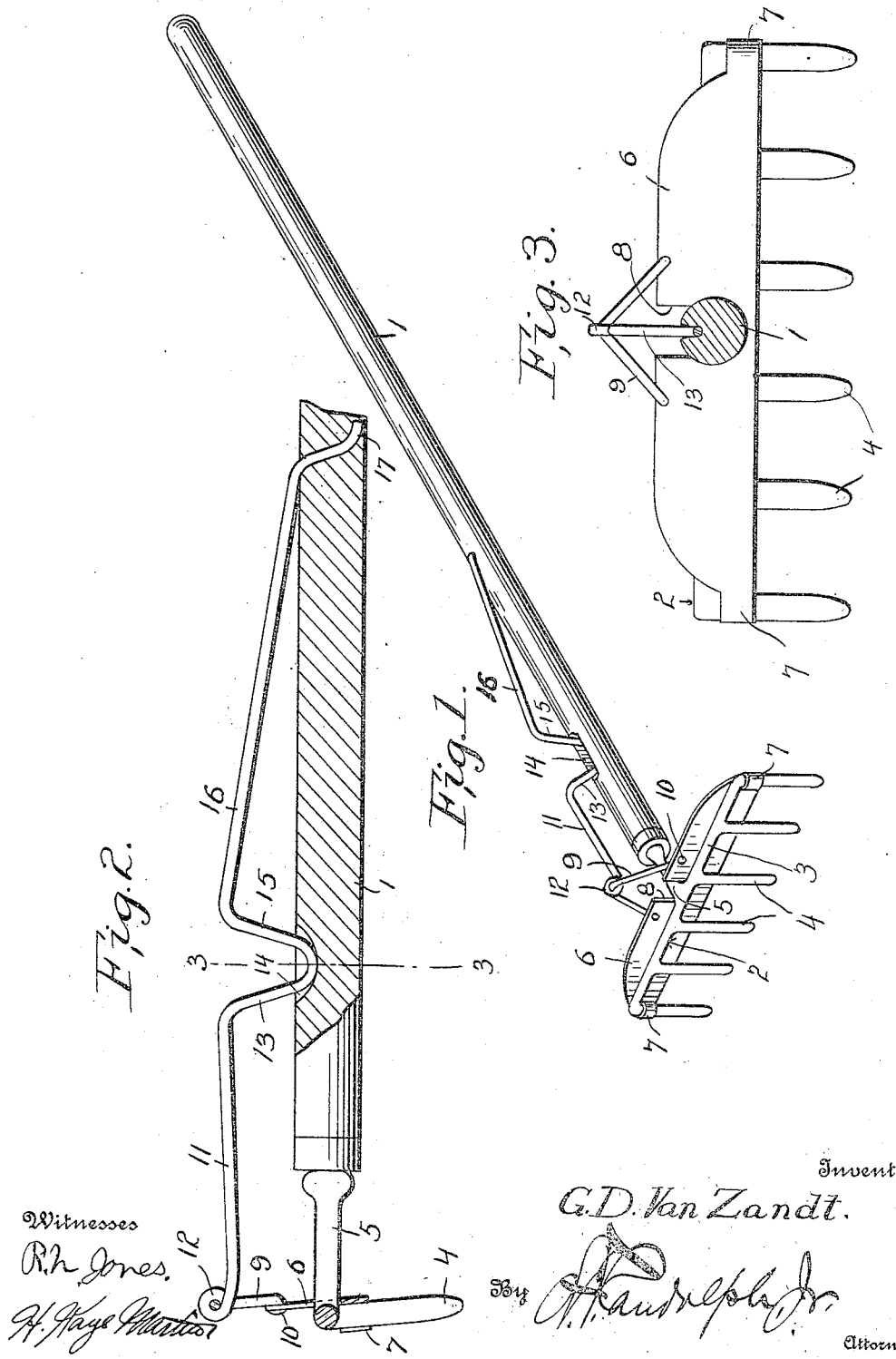
Inventor
G. D. Van Zandt.

UNITED STATES PATENT OFFICE.

GEORGE D. VAN ZANDT, OF PEARL RIVER, NEW YORK.

RAKE-CLEANER.

1,084,982.  Specification of Letters Patent.  Patented Jan. 20, 1914.

Application filed June 2, 1913. Serial No. 771,297.

*To all whom it may concern:*

Be it known that I, GEORGE D. VAN ZANDT, a citizen of the United States, residing at Pearl River, in the county of Rockland and State of New York, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in automatic rake cleaners, and has for its object to provide a device which will clean the rake teeth of grass, leaves and other matter which are apt to collect thereon.

Another object of my invention is to provide a device of that character which may be attached to an ordinary type of rake without materially changing the construction of the same.

With the above and other objects in view, I will now proceed to describe my invention in the following specification and accompanying drawings, in which—

Figure 1 is a perspective view of my improved rake cleaner; Fig. 2 is a longitudinal sectional view of my improved rake cleaner; and Fig. 3 is a transverse sectional view taken on line 3—3 of Fig. 2.

Referring to the drawings by characters of reference, 1 indicates the handle of a rake of the usual character, which is indicated generally by the numeral 2. This rake preferably comprises the usual horizontal bar 3, from which extend the teeth 4 and a shank 5 which is adapted to enter the aperture in the handle 1 and hold the rake firmly in place.

My improved cleaner preferably comprises a blade 6, having formed integrally therewith, and at each extremity thereof, an outstanding portion indicated by the numeral 7, which is curved to form a collar adapted to slide on the end teeth of the rake. Intermediate the ends of the blade 6 I provide the cut away portion 8, which forms a U-shaped recess adapted to fit around the shank 5 of the rake head.

A substantially U-shaped member 9, formed preferably of a single piece of wire, is provided at the ends of its arms with angularly extending portions, which are adapted to enter apertures in the blade 6 and be securely fastened therein, as clearly illustrated at 10.

Pivotally secured at the opposite end of the U-shaped member I preferably provide the spring 11, having a loop 12 formed thereon which loop is adapted to surround the U-shaped member and form the pivotal connection. The opposite end of the spring 11 is bent downwardly, as clearly illustrated at 13, and enters a recess 14 formed in the handle 1. The spring is then extended upwardly, as clearly shown at 15, and again bent at substantially right angles, as clearly shown in Fig. 2, to form a rearwardly extending portion 16. Thus it will be seen that a fulcrum will be formed intermediate the extensions 11 and 16, which will normally hold the end 11 in the raised position indicated in the drawing. The rear end of the portion 16 is bent downwardly and inserted in an aperture formed in the rake handle and is held securely therein by the extension 17, which is bent to hold the spring from becoming displaced.

In use the rake is used in the usual manner, and when it is desired to clean the same, this may be accomplished by a slight pressure downwardly on the free end of the spring 11, which will cause the same to have a reciprocal action, and, through the medium of the U-shaped member 9 the blade will be caused to descend with relation to the rake teeth and strip the same of any grass or litter which may have accumulated thereon. The action of the spring 11 will return the blade to its normal position when the pressure is removed, and it will be obvious that the rake may be again used in the ordinary manner.

While in the foregoing I have shown and described the preferred embodiment of my invention, I wish it to be understood that I may change the specific arrangements of parts without in any way departing from the spirit and scope of my invention.

Having thus fully described my invention what I claim is:

1. In combination with a rake, a cleaner comprising a blade having collars at its longitudinal extremities, and a recess intermediate its ends adapted to receive the shank of the rake, said collars forming guides for the blade, a U-shaped member secured immediately adjacent the sides of the recess, a spring secured to the U-shaped member, said spring extending longitudinally with relation to the rake handle and being adapted to exert upward pressure against the U-shaped member, whereby the blade is normally held in its upward position.

2. In combination with a rake, a cleaner comprising a blade having a recess intermediate its ends adapted to receive the shank of the rake, collars formed at the ends of the blade, said collars adapted to surround the end teeth of the rake and act as a guide for the blade, an inverted U-shaped member having its arms connected to the blade immediately adjacent the recess, a spring secured to the U-shaped member at its uppermost extremity, said spring extending rearwardly and in alinement with the handle, and means to hold the spring in operative relation with the rake.

3. In combination with a rake, a cleaner comprising a blade, collars formed at the ends of said blade, said collars being adapted to surround the end teeth of the rake, said blade having a centrally disposed recess intermediate its ends adapted to receive the shank of the rake, a U-shaped member secured intermediate the ends of the blade and in direct alinement with the recess, a spring secured to the U-shaped member, said spring extending rearwardly in alinement with the rake handle and projecting through an aperture therein, a downwardly projecting portion formed intermediate the ends of the spring, said downwardly projecting portion adapted to enter a recess in the rake handle adjacent the head and form a fulcrum for the spring.

In testimony whereof I affix my signature in presence of two witnesses.

GEORGE D. VAN ZANDT.

Witnesses:
E. K. VAN BEUREN,
THOMAS P. DALTON.

---

Copies of this patent may be obtained for five cents each, by addressing the "Commissioner of Patents, Washington, D. C."